No. 781,642. PATENTED FEB. 7, 1905.
J. T. DUNCAN.
VEHICLE TONGUE TRUCK OR SUPPORT.
APPLICATION FILED MAY 19, 1904.
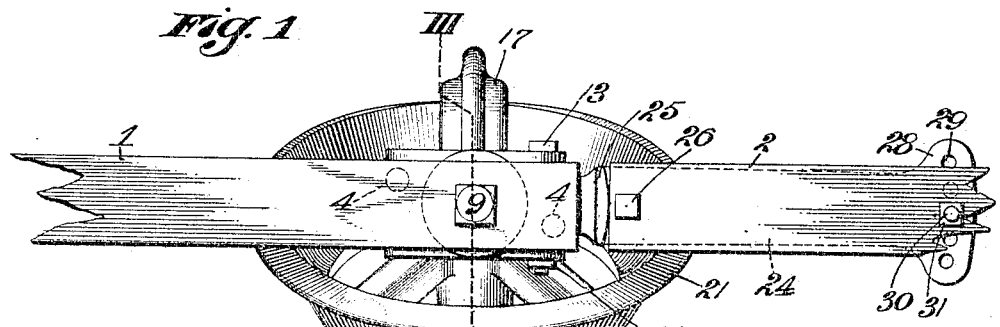
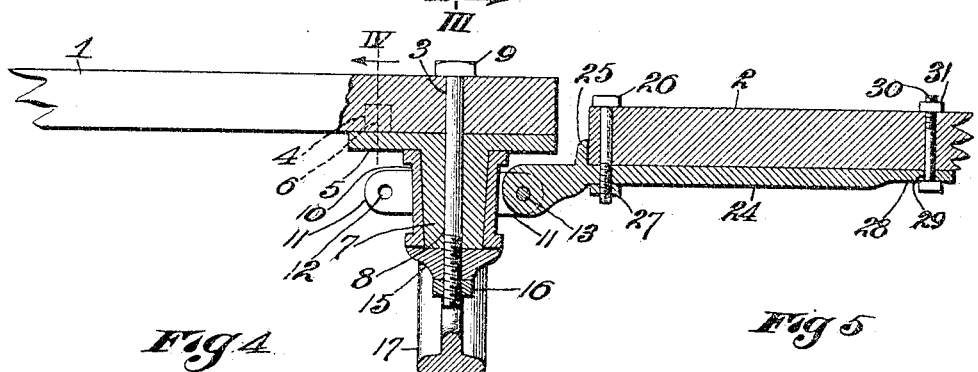
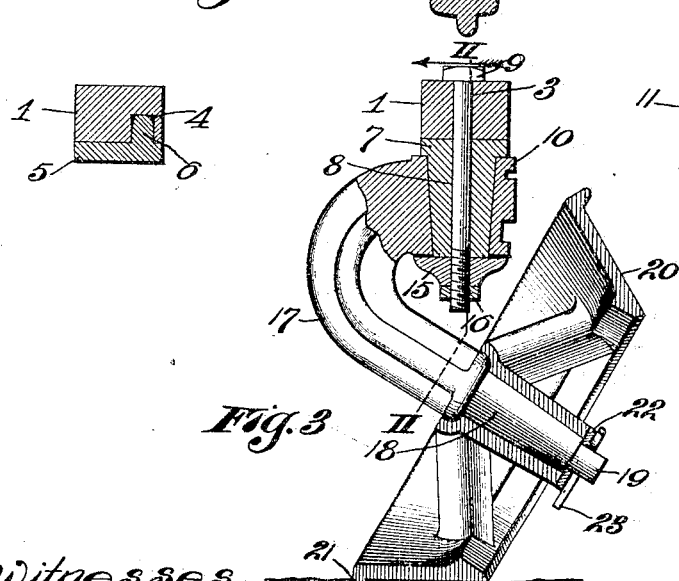
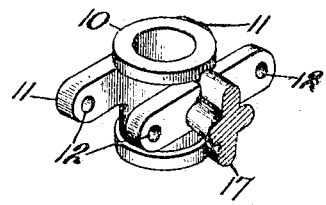
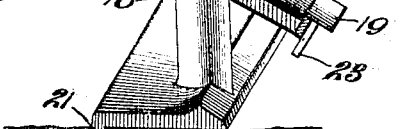
Witnesses
J. R. Glow
H. C. Rodgers
Inventor
J. T. Duncan.
By George J. Thorp
Atty.

No. 781,642.                                                    Patented February 7, 1905.

UNITED STATES PATENT OFFICE.

JOSEPH T. DUNCAN, OF DELPHOS, KANSAS, ASSIGNOR OF ONE-HALF TO T. R. CLENDINEN, OF ATCHISON, KANSAS.

VEHICLE-TONGUE TRUCK OR SUPPORT.

SPECIFICATION forming part of Letters Patent No. 781,642, dated February 7, 1905.

Application filed May 19, 1904. Serial No. 208,658.

*To all whom it may concern:*

Be it known that I, JOSEPH T. DUNCAN, a citizen of the United States, residing at Delphos, in the county of Ottawa and State of Kansas, have invented certain new and useful Improvements in Vehicle-Tongue Trucks or Supports, of which the following is a specification.

This invention relates to tongue trucks or supports for corn-harvesters, binders, and other machines, and has for its object to produce means for removing the neck weight of such machines from the team and for eliminating the side draft while the machines are in motion.

A further object is to produce a device of the character mentioned which is simple, strong, durable, and inexpensive of construction and which can be easily and quickly adapted for use in connection with machines now in use.

With these objects in view the invention consists in certain novel and peculiar features of construction and combination of parts, as hereinafter described and claimed, and in order that it may be fully understood reference is to be had to the accompanying drawings, in which—

Figure 1 represents a top plan view of a portion of the tongue of a machine as equipped with my improvement. Fig. 2 is a vertical section taken on the line II II of Fig. 3. Fig. 3 is a cross-section on the line III III of Fig. 1. Fig. 4 is a cross-section on the dotted line IV of Fig. 2. Fig. 5 is a sectional perspective view of the rotatable wheel-carrying arm.

In the said drawings the tongue is shown as composed of a rear or stub portion 1 and a front portion 2, said portion 1 being connected to the harvester or other machine (not shown) in the usual or any preferred manner. Near its front end the stub portion is provided with a vertical passage 3 and with recesses 4 in its under side, which are disposed at diametrically opposite sides of passage 3 by preference.

5 designates a bearing-plate fitting against the under side of portion 1 and held from lateral movement thereon by bosses 6, engaging recesses 4, and provided with a vertically-depending conical portion 7, having an axial passage 8, registering with passage 3 of the tongue, and the bolt 9 extends through said registering passages.

Journaled upon the conical portion or bearing 7 is a sleeve 10, provided with parallel arms 11, projecting beyond opposite sides of the sleeve and provided with apertures 12, one set of said apertures being engaged by the pivot pin or bolt 13, which is retained in position by a nut 14.

Fitting upon the lower end of bolt 9 and against the corresponding end of the conical bearing 7 is a washer 15, a nut 16 engaging the bolt, clamping said washer tightly against said bearing, so that the former, which is of greater diameter than the latter, shall underlie the sleeve 10 and reliably support without clamping it, so as not to interfere with its rotative action, as hereinafter referred to.

The sleeve 10 is carried by and preferably formed integral with the arm 17, which is of return-bend formation, so that its lower portion shall underlie bolt 9, said underlying arm terminating in a reduced portion or spindle 18, which converges with respect to the ground and in turn is reduced to form the stem 19. A frustum-shaped wheel 20 is journaled upon spindle 18 and is of such form and proportion that its tread portion rests flatly upon the ground, its margin of greatest diameter having an outwardly-projecting flange 21 for embedment in the ground for a purpose which hereinafter appears, a washer 22 on stem 19 and a linchpin 23, extending through the stem at the outer side of the washer, serving to retain the wheel reliably upon the spindle.

24 designates a tongue-strap underlying the rear end of the tongue portion 2 and having a lug 25 at the rear end of said portion. The rear end of said strap fits between the forwardly-projecting pair of arms 11 and is pivoted upon the pin or bolt 13 carried thereby.

26 is a pivot-bolt extending down through the tongue and tongue-strap and engaged below the latter by a retaining-nut 27. The front end of the strap is laterally enlarged, as at 28, and is provided with a series of holes 29, arranged concentrically of pivot-bolt 26, a bolt 30, extending through one of said holes and the tongue and engaged by the retaining-nut 31, serving to secure the front end of the strap reliably to the tongue. The series of holes 29 are for the purpose of permitting the tongue-strap to be disposed at different angles to the front portion of the tongue for the purpose of turning the wheel to the right or left, as the case may be. By thus changing the angle of the wheel with relation to the line of draft more or less resistance to side draft is obtained, it being understood that the wheel is so disposed that its flange 21 is nearest the side of the machine from which the side draft or pull comes, and therefore more effectually resists such side draft than if it were at the opposite side of the wheel. It will thus be seen that the pivotal adjustment of the tongue-strap permits of an angular adjustment of the wheel with respect to the line of draft without necessitating a corresponding angular relation between the portions of the tongue. As a result the front portion of the tongue extends in longitudinal alinement with the rear portion, and the draft is more equally distributed on the team, it being further understood that the usual draft attachments—viz., double and swingle trees (not shown)—are secured to the stub portions of the tongue. The wide bearing which the wheel has upon the ground guards against the same digging into the ground an undesirable distance when the machine is in motion or when the weight of the machine is mainly imposed upon the tongue, in which case, as will be readily understood the rear or stub portion thereof sustains the burden and leaves only a part of the weight of the front portion on the necks of the team.

The device as illustrated is for use in connection with what is known as "left-hand-cut" machines—that is, a machine which tends to swing the tongue to the left. For use upon "right-hand-cut" machines the pivot-bolt 13 is withdrawn to disconnect the front portion of the tongue. The wheel is then rotated on the cone-bearing so as to swing the wheel to the opposite side of the tongue and its originally rearwardly projecting arms 11 to the front. The tongue-strap is then fitted between said arms 11 and secured thereto by the pivot-bolt 13 and nut 14.

The provision of a sectional tongue as described with a wheel or truck supporting the rear portion and connected to the front portion so as to turn therewith permits the machine to be turned in a smaller circle and with greater ease and convenience than would usually be possible.

From the above description it will be apparent that I have produced a tongue truck or support embodying the features of advantage enumerated as desirable and which is obviously susceptible of modification without departing from its essential spirit and scope or sacrificing any of its advantages.

Having thus described the invention, what I claim as new, and desire to secure by Letters Patent, is—

1. The combination of a vehicle-tongue composed of a front section and a rear section, a wheel supporting and bearing a swiveled relation to the rear section, connections between the front section and said wheel whereby the latter shall be turned by turning or lateral movement of the front section, and means for changing the angle of said wheel to the line of draft without turning the front section out of longitudinal alinement with the rear section of the tongue.

2. The combination with a vehicle-tongue composed of a front section and a rear section, a wheel supporting and bearing a swiveled relation to the rear section, and a strap connected to turn the wheel and to operate pivotally in a vertical plane without affecting the position of the wheel or the rear section and connected to the front section for lateral adjustment thereon.

3. The combination of a vehicle-tongue composed of a front section and a rear section, a wheel supporting and bearing a swiveled relation to the rear section, a strap connected to turn the wheel and to operate pivotally in a vertical plane, and also pivoted for lateral movement to the front section of the tongue, and means for clamping said strap at the desired point of its lateral adjustment on said front section.

4. The combination of a vehicle-tongue composed of a front section and a rear section, a wheel pitched or inclined with respect to the surface of the ground, and supporting and bearing a swiveled relation to the rear section, and connections between said wheel and the front section whereby the wheel shall be turned by the turning of the front section and the latter operate vertically without affecting the position of said wheel and the rear section.

5. The combination of a vehicle-tongue composed of a front section and a rear section, a wheel pitched or inclined with respect to the surface of the ground, and supporting and bearing a swiveled relation to the rear section, and provided with a flange projecting from its periphery for embedment in the ground, and connections between said wheel and the front section whereby the wheel shall be turned by the turning of the front section and the latter operate vertically without affecting the position of said wheel and the rear section.

6. The combination of a vehicle-tongue composed of a front section and a rear section, a frustum-shaped wheel pitched or inclined with respect to the surface of the ground, and supporting and bearing a swiveled relation to the rear section and provided at its margin of greatest diameter with a flange projecting from its periphery for embedment in the ground, and connections between said wheel and the front section whereby the wheel shall be turned by the turning of the front section and the latter operate vertically without affecting the position of said wheel and the rear section.

7. The combination with a vehicle-tongue composed of sections, a bearing secured to the rear section, an arm swiveled thereon for horizontal movement and provided with parallel arms, a wheel journaled on said bearing-arm, a strap pivoted for vertical movement to said pair of arms, means for pivotally uniting the front section with said strap to permit of pivotal movement of the latter in a horizontal plane with relation to said section, and means to clamp said strap and section rigidly together at the desired point of adjustment.

8. The combination with a vehicle-tongue composed of sections, a bearing secured to the rear section, an arm swiveled thereon for horizontal movement and provided with substantially horizontal arms projecting in opposite directions, a wheel journaled on said bearing-arm, and a strap pivoted for vertical movement to one of said oppositely-projecting arms, and secured to the front section.

9. The combination with a vehicle-tongue composed of sections, a bearing secured to the rear section, an arm swiveled thereon for horizontal movement and provided with substantially horizontal arms projecting in opposite directions, a wheel journaled on said bearing-arm, a strap pivoted for vertical movement to one of said arms, means pivotally connecting said strap for lateral movement to said front section, and means for clamping said strap and front section at the desired point of adjustment.

10. The combination with a vehicle-tongue composed of sections, a bearing depending from the rear section, a bolt extending through said section and the bearing, a washer secured on the bolt below the bearing, a return-bend arm underlying the bolt and having a sleeve portion at its upper end journaled on the bearing and supported by the washer, a wheel pitched or inclined with respect to the ground journaled on the lower portion of said arm and provided with a flange for embedment in the ground, arms projecting in opposite directions from the sleeve, and a strap pivoted for vertical movement on one of said arms and secured to the front section.

In testimony whereof I affix my signature in the presence of two witnesses.

JOSEPH T. DUNCAN.

Witnesses:
H. C. ROGERS,
G. Y. THORPE.